United States Patent
Kurata

(10) Patent No.: US 8,461,281 B2
(45) Date of Patent: Jun. 11, 2013

(54) INSULATING POLYMER MATERIAL COMPOSITION

(75) Inventor: Yasuyuki Kurata, Yokohama (JP)

(73) Assignee: Meidensha Corporation, Tokyo (JP)

( * ) Notice: Subject to any disclaimer, the term of this patent is extended or adjusted under 35 U.S.C. 154(b) by 40 days.

(21) Appl. No.: 12/526,146

(22) PCT Filed: Jan. 17, 2008

(86) PCT No.: PCT/JP2008/050511
§ 371 (c)(1),
(2), (4) Date: Aug. 6, 2009

(87) PCT Pub. No.: WO2008/096579
PCT Pub. Date: Aug. 14, 2008

(65) Prior Publication Data
US 2010/0324228 A1    Dec. 23, 2010

(30) Foreign Application Priority Data
Feb. 9, 2007    (JP) ................. 2007-029892

(51) Int. Cl.
*C08L 71/10*    (2006.01)
*C08G 59/00*    (2006.01)

(52) U.S. Cl.
USPC ........... 527/601; 525/396; 525/451; 524/284; 524/315

(58) Field of Classification Search
USPC ................ 525/451, 122; 527/601; 528/44, 528/94, 112; 523/173, 443; 524/109, 140, 524/297, 313
See application file for complete search history.

(56) References Cited

U.S. PATENT DOCUMENTS

| 4,375,521 | A | * | 3/1983 | Arnold ........................ 523/173 |
| 5,698,631 | A | * | 12/1997 | Sigworth et al. ............. 525/122 |
| 5,833,883 | A | | 11/1998 | Afzali-Ardakani et al. |
| 6,194,490 | B1 | * | 2/2001 | Roth et al. .................... 523/443 |
| 6,339,116 | B1 | | 1/2002 | Afzali-Ardakani et al. |
| 2004/0192859 | A1 | | 9/2004 | Parker et al. |
| 2004/0220378 | A1 | * | 11/2004 | Kuntimaddi et al. ...... 528/329.1 |

FOREIGN PATENT DOCUMENTS

| JP | 2002-53699 A | 2/2002 |
| JP | 2002-358829 A | 12/2002 |
| JP | 2006-241331 A | 9/2006 |
| JP | 2007-31498 A | 2/2007 |
| WO | WO 2008/016119 A1 | 2/2008 |

OTHER PUBLICATIONS

Office Action in TW Appln No. 10120240990 dated Mar. 15, 2012.
Database WPI, Week 200725, Thomson Scientific, London, GB, AN 2007-246844, XP 000002658639, & JP 2007 035337 A (Meidensha Corp.), Feb. 8, 2007, 2 pages (abstract).
Supplementary European Search Report; Sep. 22, 2011; 5 pages.

* cited by examiner

*Primary Examiner* — James J Seidleck
*Assistant Examiner* — S. Camilla Pourbohloul
(74) *Attorney, Agent, or Firm* — Foley & Lardner LLP

(57) ABSTRACT

An insulating polymer material composition is obtained by adding curing agent (amine, acid anhydride, or phenol, preferably imidazole), curing accelerator, etc. (curing accelerator such as organic peroxide, amine, imidazole, or the like, and reaction aid such as peroxide), kneading under conditions according to the amounts of addition, and subjecting the kneaded substance to heat treatment, thereby conducting a peroxide vulcanization and achieving a three-dimensional crosslinking. This insulating polymer material composition is applied to polymer products such as high-voltage devices, etc.

1 Claim, No Drawings derived polymer material and uses, for example, aldehydes as the curing agents, sufficient mechanical properties may be not obtained in a high temperature atmosphere (e.g. in the work environment for high-voltage devices or the like), though obtained in an atmosphere of about room temperature (e.g. in an environment for the printed-circuit board in terms of temperature).

INSULATING POLYMER MATERIAL COMPOSITION

TECHNICAL FIELD

The present invention relates to an insulating polymer material composition applied to, for example, an insulating structure for a high-voltage device comprising a switching device such as a circuit breaker or disconnector in the casing.

BACKGROUND TECHNOLOGY

As a material applied (for example, in such a manner as to be exposed directly to the outdoors) to an insulating structure (e.g. a portion which needs the insulating property) for a voltage device (such as a high-voltage device) comprising a switching device such as a circuit breaker or disconnector in the casing, a composition obtained by curing a polymer material containing a petroleum-derived thermosetting resin (i.e. a resin using petroleum as a starting material, such as epoxy resins or the like) as a main component, for example, a product (i.e. a molded product hereinafter referred to as a polymer product) comprising a composition formed by molding the polymer material have been conventionally and widely known.

With sophistication and concentration of society, the high-voltage device and the like have been strongly desired, for example, to be reduced in size and grown in capacity while ensuring great reliability (e.g. mechanical properties such as dielectric properties under electric field, and electrical properties). With this, the polymer product also has been required to improve in various properties.

In general, examples of a main component of the polymer material used in conventionally known polymer products are: epoxy resins of heat resistant type having a glass transition temperature (hereinafter referred to as "Tg") of not lower than 100° C.; bisphenol-A-type epoxy resins relatively high in mechanical properties (such as the strength); and the like. However, in consideration of disposal of the polymer product (for example, disposal due to lifespan or breakdown), a polymer product formed of a biodegradable polymer material has undergone development as discussed in Patent Document 1.

As a result of having tried in various technical fields (e.g. in Patent Document 2) to apply (for example, to a printed-circuit board) a composition formed by curing a plant-derived polymer material, there became known that sufficient mechanical properties can be obtained e.g. when the product is used in room temperature atmosphere. However, the composition is formed by using an aldehyde as a curing agent, and therefore it had not been applied to the high-voltage device since it is poor in mechanical properties in a high temperature atmosphere.

The above-discussed polymer product in which the heat resistant epoxy resins having a glass transition temperature (hereinafter referred to as "Tg") of not lower than 100° C. are used as the main component of the polymer material is rigid and fragile, and additionally raises a fear that cracks are easily formed when the polymer product is used in an environment where temperature changes frequently. In view of this, there had been made some attempts, for example, to use solid epoxy resins (e.g. those in which a result of a crack resistance test using a metal conductor is not higher than −30° C.) as the main component of the polymer material or to improve a crack resistance and the like by adding a large quantity of filler to the polymer material; however, such a polymer product is significantly increased in viscosity, and therefore there is a fear that a usable time (pot life; the shortest possible time for an industrial operation) cannot be sufficiently ensured thereby reducing the workability, e.g. in a molding operation.

Though the above-discussed bisphenol-A-type epoxy resins are widely used as industrial products since they are high in mechanical properties, bisphenol A in itself is regarded as a deleterious endocrine disruptor and therefore it became concerned from the environmental point. Though there is a report that a cured composition such as the polymer product is not deleterious since bisphenol A is hard to leak out therefrom, bisphenol A is deleterious even in a very small quantity (for example, even at a ppm level or more smaller amount) and may leak into the air when unreacted bisphenol A (a low molecular-weight component) exists in the composition, which raises concern.

In a limited environment, for example, in a process for synthesizing bisphenol-A-type epoxy resins and various additives or a process for molding a polymer material obtained by the synthesizing process at a polymer product production facility, there is a fear that the environment is in an atmosphere of a high concentration of bisphenol A. Further, this raises a fear of a production cost increase, since ventilation equipment (i.e. equipment for cleaning air in the work environment) is required in each of the above-discussed processes even if each of the above-discussed production processes is carried out completely without humans in attendance (or even if production lines for the polymer product are made unattended) or since ventilation equipment which had been out of assumption in conventional techniques becomes needed.

In disposal of the polymer product (e.g. disposal due to lifespan or breakdown), various disposal methods can be employed; however, every one of the methods has problems as discussed below.

For example, if an incineration treatment method is applied to the polymer product formed of the polymer material containing the petroleum-derived substance (such as epoxy resins) as the main component, various deleterious substances and carbon dioxide are emitted in large quantity thereby causing some issues such as environmental pollution and global warming, which had been the feared point. In addition, though a mere landfill method may be applied to the above-discussed polymer product, a final disposal field ensured for the landfill method is decreasing tendency through the years. The Ministry of Health and Welfare made a trial calculation of the remaining time to determine it to be about the year 2008. Then, the Economic Planning Agency gives an assumption, based on the trial calculation provided by the Ministry of Health and Welfare, that the waste-disposal cost will rocket up around 2008 thereby depressing the economic growth rate.

Additionally, though an attempt to recall and reuse (recycle) the above-discussed polymer product is also carried out, such a recycling method is not established and therefore hardly carried out. By way of exception, components relatively equal in quality (PE cable-coating members used in the polymer product) are recalled to be used as thermal energy; however, thermal energy requires a combustion treatment process so as to sometimes cause the issues of environmental pollution, global warming and the like.

However, there is a fear also in the case where the polymer product is formed of the biodegradable polymer material and uses, for example, aldehydes as the curing agents, sufficient mechanical properties may be not obtained in a high temperature atmosphere (e.g. in the work environment for high-voltage devices or the like), though obtained in an atmosphere of about room temperature (e.g. in an environment for the printed-circuit board in terms of temperature).

In view of the above, it is required to improve various problems relating to the disposal of such polymer products while keeping their properties (such as productivity, the mechanical properties, and the electrical properties) excellent.

Patent Document 1: Japanese Patent Provisional Publication No. 2002-358829

Patent Document 2: Japanese Patent Provisional Publication No. 2002-053699

DISCLOSURE OF THE INVENTION

It is, therefore, an object of the present invention to provide an insulating polymer material composition environmentally excellent and having a sufficient biodegradability, while imparting good mechanical and electrical properties to a polymer product such as the high-voltage device without reducing productivity (workability and the like).

An aspect of the present invention resides in an insulating polymer material composition applied to an insulating structure for a voltage device. It is characterized in that it is formed of a kneaded substance obtained by adding a castor oil-series polyol or phenol resin as a curing agent to an epoxidized linseed oil and the kneaded substance has been three-dimensionally crosslinked by a heat treatment.

Furthermore, according to another aspect of the present invention, the kneaded substance is characterized in that an imidazole has been added as a curing accelerator.

Furthermore, according to another aspect of the present invention, the kneaded substance is characterized in that peroxide has been added as a reaction aid.

Furthermore, according to another aspect of the present invention, it is characterized in that the peroxide has been added in 0.5-5 phr.

According to the above aspects, it is allowed to obtain high volume resistivity (insulating property) and mechanical properties even if the filler is not used in such large quantity as in conventional polymer products.

Furthermore, the above-discussed insulating polymer material composition generates neither deleterious substances nor carbon dioxide even if incinerated, and additionally is sufficiently biodegradable when landfilled in soil.

BEST MODE FOR CARRYING OUT THE INVENTION

Hereinafter, an embodiment of an insulating polymer material composition according to the present invention will be discussed in detail.

In this embodiment, a polymer material (i.e. a polymer material formed of a natural material as a base material (a starting material)) naturally originated and capable of three-dimensionally crosslinking is used in place of a petroleum-derived polymer material such as epoxy resins, in an insulating polymer material composition applied to a portion of a polymer product requiring the insulating property.

More specifically, it is noted that the polymer material as discussed above can be applied to a high-voltage device without reducing the workability while sufficiently ensuring excellent electrical and mechanical properties, and that, since the polymer material in itself causes almost no hazard and is carbon-neutral, a composition (e.g. a polymer product) formed of the polymer material is able to prevent or suppress the emission of deleterious substances (such as endocrine disruptor) and carbon dioxide and the like even if incinerated. For example, the composition formed of the polymer material as discussed above can be biodegraded when landfilled in soil. The naturally originated polymer material is known to be applied to a printed-circuit board; however, it has never been applied to the high-voltage device.

Concrete examples of the polymer material naturally originated and capable of three-dimensionally crosslinking as discussed above are those using an epoxidized linseed oil. The epoxidized linseed oil has been widely used, for example, as a stabilizer for vinyl chloride resins, as well as an epoxidized soybean oil; however, it has never been applied to and never been studied as the polymer product for the high-voltage device since it is low in Tg property and mechanical properties and poorer in reactivity than common industrial epoxy resins so as to need a long time for being cured.

In the present embodiment, epoxidized linseed oil is not used simply as a stabilizer or the like as above, but it is an insulating polymer material composition by curing the epoxidized linseed oil. It has been found that Tg is improved by trying the cure using the curing substance (adding to epoxidized linseed oil), thereby increasing insulating property of the insulating polymer material composition and obtaining properties (for example, dielectric breakdown field property is better) better than those of existing industrial epoxy resin products.

In the curing agent, those such as amines, acid anhydrides, phenols, and imidazoles are known as curing substances capable of reacting with epoxy resin. These curing agents are, however, each derived from petroleum. Thus, it is preferable to apply a naturally-derived curing agent, such as castor oil-series polyol.

The above-mentioned castor oil-series polyol is one obtained by purifying an oil extracted from seeds of vegetable castor-oil plant. The number of end hydroxy groups is great. It is possible to produce various cured products from high-curing-degree ones to low-curing-degree ones by the reaction with isocyanate. In general, it is applied as a polyurethane raw material. There is no report of having applied or studied as a curing agent of epoxy resin (particularly epoxidized linseed oil).

As mentioned above, the reaction between epoxidized linseed oil and the curing agent (imidazoles and phenols) is essentially a reaction between a substance having an aromatic ring and a substance having a hydroxy group. If it is widely interpreted, it corresponds to a reaction between an epoxy resin containing epoxidized linseed oil and polyphenol.

After calculating an epoxy equivalent, for example, by oxirane concentration of epoxidized linseed oil, the curing agent (for example, it is added by 1.0 relative to stoichiometric ratio) is added in a stoichiometric amount based on the epoxy equivalent. It is possible to suitably set such mixing ratio of the curing agent, for example, by the priority order of properties required of the target polymer product (for example, it is possible to make it have 1:1 in the mixing ratio of epoxidized linseed oil to castor oil-series polyol from the epoxy equivalent and the hydroxy equivalent and to set it by increasing or decreasing in a range of about ±10%).

Besides the above-mentioned epoxidized linseed oil and curing agent, it is possible to suitably use various additives for the purpose of trying to improve, for example, workability (e.g., shortening of the working time, etc.) and to improve forming property, Tg property, mechanical and physical properties, electric properties, etc. It is possible to suitably jointly use, for example, a curing accelerator (the starting point of curing of the curing agent; e.g., organic peroxides, amines, imidazoles, etc.), a reaction suppressor, a reaction aid (for the purpose of controlling the reaction (Tg property); peroxide, etc.), etc.

When peroxide is added to the polymer material and the like and then kneading is conducted, the kneaded substance has a fear of viscosity increase with the passage of time and productivity lowering (e.g., lowering of kneading property and formability). It is, however, possible to consider it as one having a good productivity, if the usable time is, for example, 60 minutes or more.

The crosslinking in the insulating polymer material composition of the present embodiment is caused essentially by the curing agent. Therefore, the crosslinking structure is not affected by the curing condition and by the presence or absence of the above-mentioned curing accelerator, reaction suppressor, reaction aid, etc.

For example, the curing conditions (temperature, time, etc.) are suitably set to obtain properties of the target insulating polymer material composition (for example, they are suitably set in accordance with the type of the curing accelerator, the mixing amount, etc.). Even if the curing conditions are different (for example, even if they are suitably set by those other than temperature and time shown in the after-mentioned examples), there occurs no big difference in the properties themselves. Furthermore, the reaction accelerator and the reaction suppressor are suitably applied for the purpose of improving workability, productivity, and the like by increasing reactivity and making it safe (suppressing). Even if the types and the mixing amounts of the reaction accelerator and the reaction suppressor are different, there occurs no big difference in the properties themselves. Furthermore, similar to the above-mentioned reaction accelerator and reaction suppressor, the reaction aid is suitably applied (for example, it is suitably applied in accordance with the curing conditions and the type and the mixing amount of the curing accelerator and the like) in order to adjust the reactivity (for example, to adjust Tg property in the case of peroxide). Even if the type and the mixing amount of the reaction aid are different (for example, even if a dilution, such as silica or the like, that is a nonhazardous material species as the peroxide is applied), there occurs no big difference in the properties themselves.

EXAMPLES

Then, Examples 1 and 2 of the insulating polymer material composition in the present embodiment are explained.

Example 1

In the present Example 1, firstly, various castor oil series polyols (H-73X, H-92, H-102, H-410, AC-001, AC-005, and H-368 made by ITOH OIL CHEMICALS CO., LTD.; hereinafter they are respectively referred to as polyols P1-P7) were added in stoichiometric amounts (in epoxy equivalent, the calculation was conducted by considering the oxirane oxygen as being an oxygen constituting the epoxy group, and they were added as 1.0 relative to the stoichiometric ratio) to an epoxidized linseed oil (DAIMAC L-500 made by DAICEL CHEMICAL INDUSTRIES, LTD.). Furthermore, as the curing accelerator, an imidazole (2-ethyl-4-methylimidazole) was added 0.8 phr as shown in the after-mentioned Table 1, followed by kneading (kneading in conditions according to the amount added). Then, the kneaded substances were subjected to heat treatment under various curing conditions (temperature and time), thereby respectively producing Samples S1-S7 of the three-dimensionally crosslinked, insulating polymer material compositions.

Furthermore, as comparative examples of the above-mentioned samples S1-S7, phthalic anhydride (HN2200 made by Hitachi Chemical Co., Ltd.) was added as a curing agent to bisphenol A type epoxy resin (CT200A made by Vantico Inc.). Furthermore, the above-mentioned imidazole was added 0.8 phr as a curing accelerator as shown in the after-mentioned Table 1, followed by kneading (kneading under conditions according to the amount added). Then, the kneaded substance was subjected to a heat treatment at a temperature of 170° C. for 20 hours, thereby producing Sample S8 of the three-dimensionally crosslinked insulating polymer material composition.

Then, Tg property as heat resistance (Tg property by TMA measuring apparatus), volume resistivity as an electric property (insulation property), flexural strength (flexural strength by universal testing machine) under an atmosphere of room temperature (20° C.) as a mechanical property were measured in order to examine various properties of the above-mentioned respective Samples S1-S8. The respective measurement results are respectively shown in the following Table 1.

TABLE 1

|  | Samples | | | |
| --- | --- | --- | --- | --- |
|  | S1 | S2 | S3 | S4 |
| Polymer Material Type | Epoxidized Linseed Oil | Epoxidized Linseed Oil | Epoxidized Linseed Oil | Epoxidized Linseed Oil |
| Curing Agent Type | Polyol P1 | Polyol P2 | Polyol P3 | Polyol P4 |
| Curing Accelerator Type | Imidazole | Imidazole | Imidazole | Imidazole |
| Heat Treatment Condition | 170° C., 20 hr | 170° C., 20 hr | 150° C., 20 hr | 150° C., 20 hr |
| Tg Property (° C.) | 75° C. | 80° C. | 80° C. | 85° C. |
| Volume Resistivity (Ω · cm) | 12E+14 | 15E+14 | 18E+14 | 16E+14 |
| Flexural Strength (MPa) | 130 | 135 | 130 | 125 |
|  | Samples | | | |
|  | S5 | S6 | S7 | S8 |
| Polymer Material Type | Epoxidized Linseed Oil | Epoxidized Linseed Oil | Epoxidized Linseed Oil | Epoxy Resin |
| Curing Agent Type | Polyol P5 | Polyol P6 | Polyol P7 | Phthalic Anhydride |
| Curing Accelerator Type | Imidazole | Imidazole | Imidazole | Imidazole |
| Heat Treatment Condition | 150° C., 15 hr | 150° C., 15 hr | After heating of 100° C., 10 hr, heating at 150° C., 10 hr as it is. | 150° C., 20 hr |
| Tg Property (° C.) | 90° C. | 85° C. | 80° C. | 80° C. |
| Volume Resistivity (Ω · cm) | 25E+14 | 13E+14 | 17E+14 | 8E+14 |
| Flexural Strength (MPa) | 135 | 130 | 130 | 120 |

As shown in the above Table 1, it has been found that Samples S1-S7 using epoxidized linseed oil and polyols P1-P7 have Tg properties comparable to that of Sample S8 using bisphenol A type epoxy resin and phthalic anhydride and have volume resistivities and flexural strengths higher than the case of the Sample S8.

Example 2

In the present Example 2, firstly, 61 g of a phenol resin (a phenol-formaldehyde type novolak (PR-HF-3) made by SUMITOMO BAKELITE CO., LTD.) was added as a curing agent (that is, it was added in stoichiometric amount (in epoxy equivalent, the calculation was conducted by considering the oxirane oxygen as being an oxygen constituting the epoxy group, and it was added as 1.0 relative to the stoichiometric ratio) to 100 g of an epoxidized linseed oil (DAIMAC L-500 made by DAICEL CHEMICAL INDUSTRIES, LTD.). Furthermore, as the curing accelerator, an imidazole (2-ethyl-4-methylimidazole (2E4MZ made by SHIKOKU CHEMICALS CORPORATION)) was added (1.0 g or 1.0 gram (phr) relative to 100 g of the epoxy resin). As a reaction aid, various peroxides (PERHEXA C, PERCUMYL D and PERHEXYN 25B made by NOF CORPORATION; hereinafter respective ones are referred to as oxides O1-O3) were added 0-5.0 phr as shown in the after-mentioned Table 2, followed by kneading (kneading under conditions according to the amount added). Then, the kneaded substance was subjected to a heat treatment at a temperature of 150° C. for 24 hours, thereby respectively producing Samples S9-S30 of the three-dimensionally crosslinked insulating polymer material compositions.

Furthermore, as comparative examples of the above samples S9-S30, phthalic anhydride as a curing agent and tertiary amine (DMP-30 made by Meiden Chemical Co., Ltd) as a curing accelerator were added to bisphenol A type epoxy resin, followed by kneading (kneading under conditions according to the amount added). Then, the kneaded substance was subjected to a heat treatment at a temperature of 120° C. for 16 hours, thereby producing Sample S31 of the three-dimensionally crosslinked insulating polymer material composition.

Then, usable time (a period of time until reaching 100 P with a B-type viscometer) as productivity (kneading property and formability of the kneaded substance) of the above-mentioned respective samples S9-S31, Tg property as heat resistance (Tg property by TMA measuring apparatus), volume resistivity as an electric property (insulation property), flexural strengths (flexural strengths by universal testing machine) under atmospheres of room temperature (20° C.) and high temperature (80° C.) as mechanical properties were measured. The respective measurement results are respectively shown in the following Table 2 and Table 3.

TABLE 2

| | | S9 | S10 | S11 | S12 | S13 | S14 | S15 | S16 |
|---|---|---|---|---|---|---|---|---|---|
| Polymer Material Type | | Epoxidized Linseed Oil | Epoxidized Linseed Oil | Epoxidized Linseed Oil | Epoxidized Linseed Oil | Epoxidized Linseed Oil | Epoxidized Linseed Oil | Epoxidized Linseed Oil | Epoxidized Linseed Oil |
| Curing Agent Type | | Phenol Resin | Phenol Resin | Phenol Resin | Phenol Resin | Phenol Resin | Phenol Resin | Phenol Resin | Phenol Resin |
| Curing Accelerator Type | | Imidazole | Imidazole | Imidazole | Imidazole | Imidazole | Imidazole | Imidazole | Imidazole |
| Peroxide | Type | Oxide O1 | Oxide O1 | Oxide O1 | Oxide O1 | Oxide O1 | Oxide O1 | Oxide O1 | Oxide O1 |
| | Mixing Amount (phr) | 0 | 0.25 | 0.5 | 1.0 | 2.0 | 3.0 | 4.0 | 5.0 |
| Usable Time (minute) | | 122 | 118 | 110 | 94 | 85 | 77 | 65 | 48 |
| Tg Property (° C.) | | 65 | 65 | 78 | 95 | 98 | 98 | 99 | 99 |
| Volume Resistivity (Ω·cm) | | Exceeding 1.0E+15 | Exceeding 1.0E+15 | Exceeding 1.0E+15 | Exceeding 1.0E+15 | Exceeding 1.0E+15 | Exceeding 1.0E+15 | Exceeding 1.0E+15 | Exceeding 1.0E+15 |
| Flexural Strength (MPa) | Room Temp. (20° C.) | 80 | 78 | 125 | 125 | 128 | 127 | 124 | 25 |
| | High Temp. (80° C.) | 15 | 17 | 48 | 61 | 66 | 65 | 66 | 48 |

| | | S17 | S18 | S19 | S20 | S21 | S22 | S23 |
|---|---|---|---|---|---|---|---|---|
| Polymer Material Type | | Epoxidized Linseed Oil | Epoxidized Linseed Oil | Epoxidized Linseed Oil | Epoxidized Linseed Oil | Epoxidized Linseed Oil | Epoxidized Linseed Oil | Epoxidized Linseed Oil |
| Curing Agent Type | | Phenol Resin | Phenol Resin | Phenol Resin | Phenol Resin | Phenol Resin | Phenol Resin | Phenol Resin |
| Curing Accelerator Type | | Imidazole | Imidazole | Imidazole | Imidazole | Imidazole | Imidazole | Imidazole |
| Peroxide | Type | Oxide O2 | Oxide O2 | Oxide O2 | Oxide O2 | Oxide O2 | Oxide O2 | Oxide O2 |
| | Mixing Amount (phr) | 0.25 | 0.5 | 1.0 | 2.0 | 3.0 | 4.0 | 5.0 |
| Usable Time (minute) | | 120 | 111 | 95 | 88 | 74 | 63 | 45 |
| Tg Property (° C.) | | 65 | 82 | 92 | 97 | 100 | 102 | 103 |
| Volume Resistivity (Ω·cm) | | Exceeding 1.0E+15 | Exceeding 1.0E+15 | Exceeding 1.0E+15 | Exceeding 1.0E+15 | Exceeding 1.0E+15 | Exceeding 1.0E+15 | Exceeding 1.0E+15 |
| Flexural Strength (MPa) | Room Temp. (20° C.) | 81 | 128 | 129 | 129 | 128 | 125 | 99 |
| | High Temp. (80° C.) | 16 | 45 | 58 | 60 | 64 | 64 | 33 |

TABLE 3

|  | Samples | | | |
| --- | --- | --- | --- | --- |
|  | S24 | S25 | S26 | S27 |
| Polymer Material Type | Epoxidized Linseed Oil | Epoxidized Linseed Oil | Epoxidized Linseed Oil | Epoxidized Linseed Oil |
| Curing Agent Type | Phenol Resin | Phenol Resin | Phenol Resin | Phenol Resin |
| Curing Accelerator Type | Imidazole | Imidazole | Imidazole | Imidazole |
| Peroxide Type | Oxide O3 | Oxide O3 | Oxide O3 | Oxide O3 |
| Mixing Amount (phr) | 0.25 | 0.5 | 1.0 | 2.0 |
| Usable Time (minute) | 111 | 99 | 87 | 78 |
| Tg Property (° C.) | 66 | 84 | 92 | 95 |
| Volume Resistivity (Ω · cm) | Exceeding 1.0E+15 | Exceeding 1.0E+15 | Exceeding 1.0E+15 | Exceeding 1.0E+15 |
| Flexural Strength (MPa) Room Temp. (20° C.) | 82 | 115 | 125 | 133 |
| High Temp. (80° C.) | 15 | 39 | 59 | 64 |

|  | Samples | | | |
| --- | --- | --- | --- | --- |
|  | S28 | S29 | S30 | S31 |
| Polymer Material Type | Epoxidized Linseed Oil | Epoxidized Linseed Oil | Epoxidized Linseed Oil | Epoxy Resin |
| Curing Agent Type | Phenol Resin | Phenol Resin | Phenol Resin | Acid Anhydride |
| Curing Accelerator Type | Imidazole | Imidazole | Imidazole | Tertiary Amine |
| Peroxide Type | Oxide O3 | Oxide O3 | Oxide O3 | — |
| Mixing Amount (phr) | 3.0 | 4.0 | 5.0 | — |
| Usable Time (minute) | 70 | 61 | 49 | — |
| Tg Property (° C.) | 99 | 105 | 106 | 85 |
| Volume Resistivity (Ω · cm) | Exceeding 1.0E+15 | Exceeding 1.0E+15 | Exceeding 1.0E+15 | 5.8E+14 |
| Flexural Strength (MPa) Room Temp. (20° C.) | 135 | 134 | 83 | 121 |
| High Temp. (80° C.) | 66 | 66 | 41 | 22 |

As shown in the above Tables 2 and 3, it has been found that Samples S9-S30 using epoxidized linseed oil, phenol resin and imidazole obtain volume resistivities superior to that of Sample 31 using bisphenol A type epoxy resin, acid anhydride and tertiary amine, have increasing Tg properties along with the increase of the peroxide mixing amount, and have sufficient usable times. Furthermore, it has been found that Samples S11-S16, S18-S23 and S25-S30, in which particularly the peroxide mixing amounts were 0.5 phr or greater (specifically 0.5-5 phr), had obtained flexural strengths (good flexural strengths particularly under a high temperature atmosphere) that were generally equivalent to or higher than that of Sample 31.

As mentioned above, according to the embodiments of the present invention, the polymer product such as the high-voltage device can obtain excellent mechanical and electrical properties without reducing the workability (for example, ensuring a sufficient pot life), and can contribute to global environmental protection.

As above, in the present invention, only specific examples described were explained in detail, but it is obvious to a person skilled in the art that various variations and modifications are possible in the scope of the technical idea of the present invention. It is natural that such variations and modifications belong to the scope of the claims.

For example, the kneading conditions and the heat treatment conditions in the kneading material, in which curing agent, curing accelerator, etc. have been added to polymer material (epoxidized linseed oil), are suitably set in accordance with the types and the amounts of addition of, for example, polymer material, curing agent, curing accelerator, etc. They are not limited to the contents shown in the present examples. Furthermore, it is clear to obtain effects similar to those shown in the present examples, even in case that various additives are suitably used, besides the above-mentioned polymer material, curing agent, curing accelerator, etc., to the extent of the level of not damaging properties of the target insulating polymer material composition.

The invention claimed is:

1. An insulating polymer material composition applied to an insulating structure for a voltage device, comprising:
  a kneaded substance obtained by adding a castor oil-series polyol or phenol resin as a curing agent to an epoxidized linseed oil and by adding a peroxide as a reaction aid,
  wherein the kneaded substance has been three-dimensionally crosslinked by heat treatment,
  wherein the peroxide has been added by 0.5-5 phr.

* * * * *